(12) United States Patent
Roche et al.

(10) Patent No.: US 8,626,197 B1
(45) Date of Patent: Jan. 7, 2014

(54) METHOD AND SYSTEM FOR LINKING INFORMATION FROM A MOBILE TELEPHONY DEVICE WITH AN ELECTRONIC FILE

(75) Inventors: Elizabeth C. Roche, Prairie Village, KS (US); Jason Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1377 days.

(21) Appl. No.: 12/058,508

(22) Filed: Mar. 28, 2008

(51) Int. Cl.
*H04W 4/02* (2009.01)

(52) U.S. Cl.
USPC .............................. 455/456.3; 705/3; 701/36

(58) Field of Classification Search
USPC .......... 455/456.3; 340/539.13; 705/3; 701/36
See application file for complete search history.

(56) References Cited

U.S. PATENT DOCUMENTS

| | | | |
|---|---|---|---|
| 2007/0293241 A1* | 12/2007 | Tamura | 455/456.1 |
| 2008/0194276 A1* | 8/2008 | Lin et al. | 455/466 |
| 2009/0177679 A1* | 7/2009 | Boomer et al. | 707/102 |

* cited by examiner

*Primary Examiner* — Phuoc Doan (57) ABSTRACT

A method and system for linking information from a mobile telephony device with an electronic file are disclosed. At least some of the illustrative embodiments may be a method comprising a computer system performing an operation on an electronic file and determining that the computer system is proximate to a first mobile telephony device. The method also comprises determining information about the first mobile telephony device, linking at least some of the information from the first mobile telephony device with the electronic file on the computer system, and storing the electronic file and the information linked with the electronic file in a memory device.

20 Claims, 5 Drawing Sheets

METHOD AND SYSTEM FOR LINKING INFORMATION FROM A MOBILE TELEPHONY DEVICE WITH AN ELECTRONIC FILE

CROSS-REFERENCE TO RELATED APPLICATIONS

None.

STATEMENT REGARDING FEDERALLY SPONSORED RESEARCH OR DEVELOPMENT

Not applicable.

BACKGROUND

A file system (e.g., Hierarchical File System (HFS) and New Technology File System (NTFS)) is at its core a method for storing and organizing electronic files on a memory device (e.g., hard disk, or CD-ROM). For example, hierarchical file systems use directories to organize electronic files in a tree structure. File systems also allow efficient search and retrieval of the electronic files from the memory device.

SUMMARY

In an embodiment, a method of linking information associated with a mobile telephony device with a file updated by a computer proximate to the mobile telephony device is provided. The method comprises a computer system performing an operation on an electronic file and determining that the computer system is proximate to a first mobile telephony device. The method also comprises determining information about the first mobile telephony device, linking at least some of the information from the first mobile telephony device with the electronic file on the computer system, and storing the electronic file and the information linked with the electronic file in a memory device.

In another embodiment, a computer system is provided. The computer system is configured to determine that a first mobile telephony device is proximate to the computer system and to perform an operation on an electronic file. The computer system is also configured to determine information about the first mobile telephony device proximate to the computer system, to link at least some of the information with the electronic file, and to store the electronic file and the information linked with the electronic file in a memory device.

In another embodiment, a computer-readable medium storing a program is provided. The program, when executed by a processor, causes the processor to perform an operation on an electronic file and to determine that the processor is proximate to a first mobile telephone device. The program also causes the processor to determine information about the first mobile telephony device, to link at least some of the information with the electronic file, and to store the electronic file and the information linked with the electronic file in a memory device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or later in existence. The disclosure should in no way be limited to the illustrative implementations, drawings, and techniques illustrated below, but may be modified within the scope of the appended claims along with their full scope of equivalents.

Referencing documents by their location within a hierarchical file system alone may make it difficult to later find the document, for example when the position of the document is deep within the tree-like structure of a complex hierarchical file system. The various embodiments are directed to linking information from a handset, mobile phone, or personal digital assistant (PDA) with a document to provide additional information that can be used to assist finding the document in the file system. A file system is used to organize and store the documents in a storage device, and at least some of the embodiments link information from a handset to the documents contemporaneously with storing the documents in the storage device. For example, a mobile phone belonging to individual A may be aware that a meeting is scheduled between individual A, individual B, and individual C at 10 AM. Using location information, the mobile phone also may be aware that at 10 AM it is substantially co-located with mobile phones associated with individual B and individual C. In this case, if a document is created or updated and saved by a computer substantially co-located with the mobile phone belonging to individual A, for example by a laptop computer associated with individual A or by the mobile phone belonging to individual A, the information related to the meeting between A, B, and C and the time of the meeting can be saved along with the document. This information related to the meeting may be used later, for example, to locate the document. While the example is directed to a mobile phone, one of ordinary skill in the art would recognize that the example could equally have been directed to other similar devices such as a personal digital assistant (PDA), a media player, a pager, a mobile computer, or a combination of functionalities of these devices. A document is an electronic file such as a textual document describing a design, a digital photograph, or an electronic mail. A storage device is a memory device such as a computer, a database or a tape drive. A computer is an electronic device configured to perform operations on an electronic file.

In at least some embodiments, an operation is performed on an electronic file stored on a computer system, and information about the mobile telephony device is determined. The information is linked with the electronic file on the computer system, and the electronic file and the information linked with the electronic file are stored in a memory device, for example in a memory of the computer system. As an example, but not by way of limitation, the information that is linked with the electronic file may be the date of a meeting, the time of the meeting, and the participants of the meeting.

Figure 1:
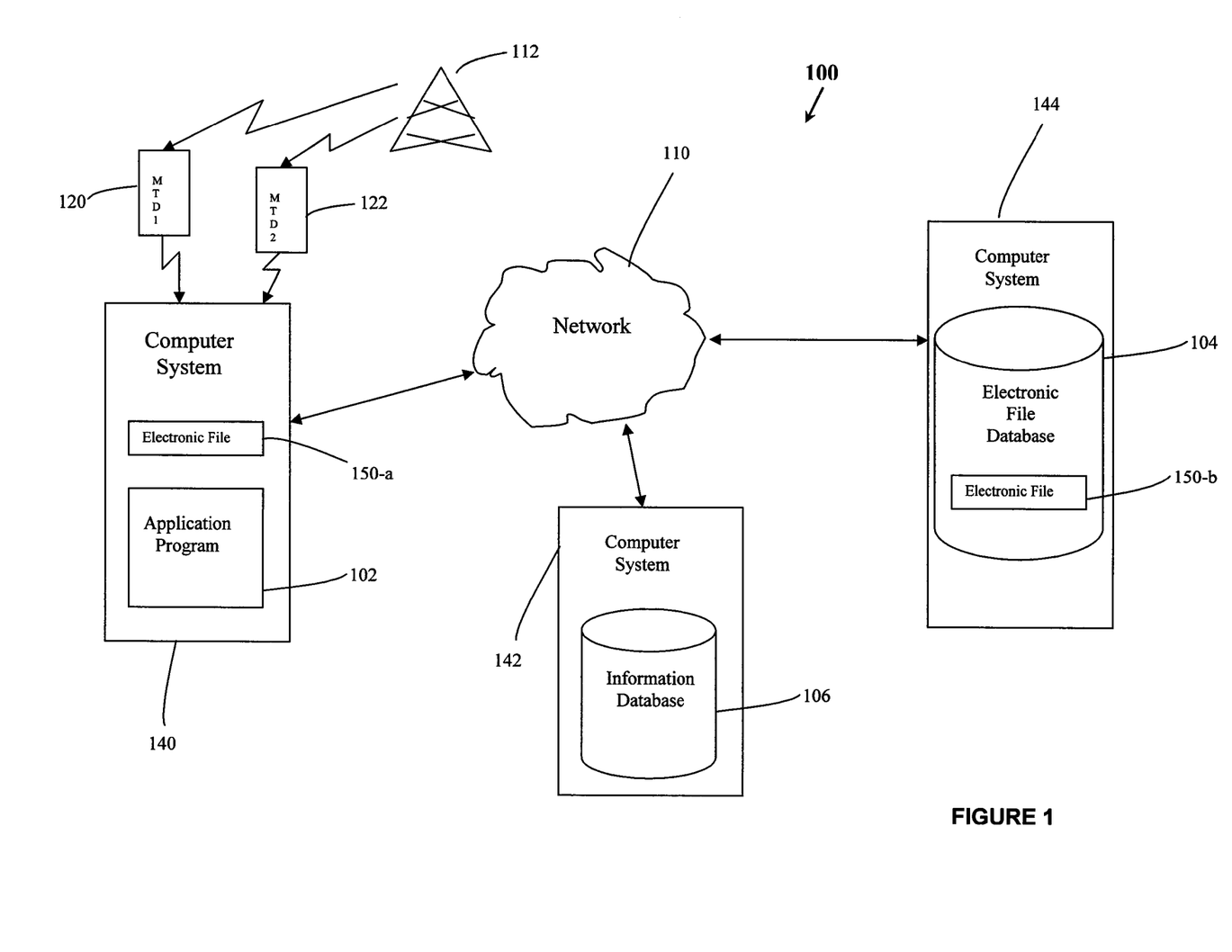
FIG. 1 shows a system for linking information from a mobile telephony device in accordance with at least some embodiments.

FIG. 1 illustrates a system 100 in accordance with at least some embodiments. In particular, the system 100 comprises an application program 102 executed on a computer system 140, an electronic file database 104 executed on a computer system 144, an information database 106 executed on a computer system 142, a base transceiver station 112 and mobile telephony devices 120-122. The mobile telephony device 120-122 may take various forms. In an embodiment, the mobile telephony device may take various forms with a screen size reduced to a maximum of 4 inches by 6 inches, including a mobile phone, a PDA, a handheld gaming device, a handheld wireless mobile device, a pager, a digital camera, a media player, and a digital calculator. The mobile telephony devices 120-122 are communicatively coupled to the computer system 140 by way of wireless communication (e.g., radio frequency identification (RFID), WIFI, BLUETOOTH®, infrared, or other) and the computer system 140 communicates with a network 110 (e.g., wireline or wireless). The mobile telephony devices 120-122 wirelessly communicate with the base transceiver station 112. FIG. 1 illustrates the system 100 comprising two mobile telephony devices 120-122 and one base transceiver station 112, however the system 100 may comprise any number of mobile telephony devices and base transceiver stations.

In at least some embodiments, the computer system 140 performs operations on an electronic file 150. For example, the operations performed on a first electronic file 150-a by the computer system 140 may comprise creating the first electronic file 150-a, editing the first electronic file 150-a, deleting the first electronic file 150-a, executing the first electronic file 150-a, or a combination of one or more of these operations. The first electronic file 150-a may be copied and/or saved in the electronic file database 104 as the second electronic file 150-b. In an embodiment, the first electronic file 150-a may be a local copy of the electronic file 150 and the second electronic file 150-b may be a public copy of the electronic file 150 available to users of the electronic file database 104. In at least some embodiments, a copy of the electronic file 150 is stored on the electronic file database 104, and a 'pointer' to the electronic file 150 is stored as a local copy on the computer system 140. Additionally, the computer system 140 executes the application program 102, and the application program 102 is communicatively coupled with the information database 106 and the electronic file database 104 by way of the network 110. The application program 102 determines information about the mobile telephony device 120 and/or information about the user of the mobile telephony device 120 and links the information determined about the mobile telephony device 120 with the electronic file 150 when the computer system 140 performs operations on the electronic file 150, for example when the computer system 140 writes and/or saves the electronic file 150. This information may be referred to as contextual information. In an embodiment, the contextual information may include the name of the user of the mobile telephony device 120, a location or place, a time and date, and file types. In an embodiment, the contextual information may include environment information including temperature, humidity, raining, snowing, or other environmental information. In an embodiment, the contextual information may include biometric information. In other embodiments, the contextual information may include other information. The contextual information also may be referred to as contextual cues.

The discussion now turns to the various embodiments of determining information about the mobile telephony device 120 and linking the information with the electronic file 150. In at least some embodiments, the mobile telephony device wirelessly communicates with the computer system 140. The application program 102 determines the information about the mobile telephony device 120 by direct wireless communication between the mobile telephony device 120 and the computer system 140. For example, the application program 102 by direct wireless communication between the mobile telephony device 120 and the computer system 140 determines information about location of the mobile telephony device 120, for example the mobile telephony device 120 may send location information in the form of coordinates or some other format to the computer system 140. In addition to information about the location, the application program 102 determines other information such as information about a user of the mobile telephony device 120 (e.g., name), and information from a calendar on the mobile telephony device 120 (e.g., a scheduled meeting, or a teleconference).

In an embodiment, the application program 102 may determine a presence of the mobile telephony device 120 by inference, based on the wireless coupling between the computer system 140 and the telephony device 120. For example, if the wireless coupling is supported by a wireless technology having a range limit of several feet, the mobile telephony device 120 may infer from the wireless coupling that the computer system 140 and the telephony device 120 are located no more than about several feet of each other. In other embodiments the application program 102 determines a presence of the mobile telephony device 120 by monitoring the wireless communication between the mobile telephony device 120 and the base transceiver station 112. In particular, the application program 102 determines if the mobile telephony device 120 is proximate (e.g., within five feet) to the computer system 140 by determining the location of the mobile telephony device. The location of the mobile telephony device 120 may be determined by any one or more of a number of available location determination approaches (e.g., Global Positioning System (GPS), by triangulation from multiple base transceiver station 112, signal strength, or other). If the presence of the mobile telephony device 120 is determined, then the application program 102 may determine information about the mobile telephony device 120 by monitoring the wireless communication between the mobile telephony device 120 and the base transceiver station 112. The application program 102 is configured to link the information determined about the mobile telephony device 120 with the electronic file 150.

Consider, for purpose of explanation, that the computer system 140 performs an operation on the first electronic file 150-a (e.g., creating an electronic file). When the computer system 140 performs the operation, the application program 102 determines the information about the mobile telephony device 120. As previously discussed, the application program 102 determines information about the mobile telephony device 120 by direct wireless communication between the mobile telephony device 120 and the computer system 140, or by monitoring wireless communication between the mobile telephony device 120 and the base transceiver station 112. The application program 102 captures information such as information about the user of mobile telephony device 120

(e.g., John Doe), information from the calendar on the mobile telephony device 120 (e.g., a teleconference with Jane Smith at 10:00 AM on Monday Dec. 1, 2007), and information about the location of the mobile telephony device 120 (e.g., Building 1A, Room Number 101 or GPS coordinates) proximate to (e.g., within ten feet of) the computer system 140. In other embodiments, the mobile telephony devices 120-122 'listen' (i.e. performs voice recognition) when the computer system 104 is performing operations on the electronic file 150. The application program 102 captures information 'listened' (e.g., items discussed during the meeting) by the mobile telephony devices 120-122.

In at least some embodiments, the application program 102 automatically links all of the information determined (i.e. John Doe, teleconference with Jane Smith, Building 1A, Room Number 101, and items discussed in the meeting) based on the mobile telephony device 120 with the first electronic file 150-*a*, and the application program 102 stores the information linked with the first electronic file 150-*a* and the first electronic file 150-*a* in a memory device such as the computer system 140.

In at least some embodiments, the application program 102 stores the information linked with the electronic file 150 in the information database 106 and the second electronic file 150-*b* on the electronic file database 104. As illustrated in FIG. 1, the electronic file database 104 stores electronic files after the computer system 140 has performed an operation on the first electronic file 150-*a*. The electronic file database 104 makes the second electronic file 150-*b* available to the computer system 140 and possibly other computer systems unrelated to the system of linking information from the mobile telephony device with the electronic file. The electronic files stored in the electronic file database 104, for example the second electronic file 150-*b*, are linked with the information stored in the information database 106. The information database 106 stores the information linked with the electronic file 150. In at least some embodiments, it is possible that at least some of the information stored on the information database 106 may be linked with a plurality of electronic files stored on the electronic files database 104. For example, the computer system 140 may perform operations on a plurality of electronic files from the same location (e.g., Building 1A, Room 101). The application program 102 links the information about the location (i.e., Building 1A, Room 101) determined about the mobile telephony device 120 with each of the plurality of electronic files and stores the information about the location in the information database 106. Thus, the information about the location (i.e., Building 1A, Room 101) in the information database 106 is linked with each of the plurality of electronic files on the electronic file database 104.

In at least some embodiments, the application program 102 is enabled to link selected information determined about the mobile telephony device 120 with the electronic file. Consider, for purpose of explanation, the previously discussed example where the application program 102 determines the information about the mobile telephony device 120 when the computer system 140 is performing an operation on the electronic file. The application program 102 makes available the information determined about the mobile telephony device 120 to a user (i.e., the user is performing the operation on the electronic file by way of the computer system 140), and the user selects at least some of the information made available by the application program 102. For example, the application program 102 makes the information (e.g., John Doe's telephone was present, teleconference with Jane Smith was on the phone's calendar, and Building 1A, Room Number 101) determined about the mobile telephony device 120 available to the user, and the user may select either all of the information made available by the application program 102 or any combination of the information made available by the application program 102. Based on the information selected by the user, the application program 102 links the selected information with the electronic file and stores the information linked with the electronic file on the information database 106, or the mobile telephony device 120.

In other embodiments, the application program 102 learns, based on the information selected by the user, to make available to the user additional relevant information determined about the mobile telephony device 120. In particular, the application program 102 learns by any one or more of a number of available learning approaches (e.g., artificial neural networks, supervised learning techniques, unsupervised learning techniques, etc.).

In still other embodiments, the application program 102 automatically selects uniform information to be linked with the electronic file 150. For example, the application program 102 automatically selects the information such as the information about the location of the mobile telephony device 120, and the information from the calendar of the mobile telephony device 120 and links the information with the electronic file 150. Stated otherwise, the application program 102 links the same information with each of the electronic files.

In alternative embodiments the application program 102 is configured to determine information about a plurality of mobile telephony devices 120-122 and link the information determined about the plurality of mobile telephony devices 120-122 with the electronic file 150. As previously discussed, the application program 102 determines the presence of the mobile telephony device 122 by determining if the mobile telephony device 122 is substantially proximate to the mobile telephony device 120. In alternative embodiments, the application program 102 determines the presence of the mobile telephony devices 120-122 by determining if one or both the mobile telephony devices 120-122 are collocated with the computer system 140. In particular, the application program 102 determines the location of the mobile telephony device 122 by any one or more of the location determination approaches. If the location of the mobile telephony device 122 is proximate to the mobile telephony device 120, then the application program 102 determines that the mobile telephony devices 120-122 are collocated. The application program 102 may determine the presence of the mobile telephony device 122 by monitoring the mobile telephony device 120 to mobile telephony device 122 communication. The application program 102 determines information (e.g., information about a user of the mobile telephony device 122, and information from a calendar on the mobile telephony device 122) about the mobile telephony device 122 and links the information with the electronic file 150.

In yet other embodiments, the mobile telephony devices 120-122 captures a picture of the individuals proximate to the computer system 140 when the computer system 140 is performing an operation on the electronics file 150. The application program 102 associates information about the individuals to the pictures, and the application program 102 links the information about the individuals and the pictures to the electronic file 150. For example, the application program 102 stores the pictures of the individuals and information about the individuals, thus, when the individuals are again proximate to the computer system 140 (i.e. after the storage of the pictures and information about the individuals) the application program 102 automatically links information about the individuals and the pictures to the electronic file 150.

In at least some embodiments, the system 100 provides for search and retrieval of electronic files from the electronic file database 104 based on the information stored on the information database 106. The information database 106 is queried based on user specified information, and an electronic file linked with the user specified information is retrieved from the electronic file database 104, for example the second electronic file 150-b. Consider, for purpose of explanation, that the information database 106 is queried with the user specified information such as John Doe, and Building 1A, Room Number 101. The information database 106 is searched based on the user specified information, and the electronic file linked with the user specified information is retrieved from the electronic file database 104, for example the second electronic file 150-b. In other embodiments, at least some of the information stored on the information database 106 is linked with a plurality of electronic files stored on the electronic files database 104. In this case, a results list formed of the plurality of electronic files linked with the user specified information is retrieved from the electronic file database 104. In at least some embodiments, the information database 106 is searched based on pre-determined information. For example, the information from the mobile telephony devices 120-122 is automatically pre-determined, and the information database 104 is searched based on the pre-determined information from the mobile telephony devices 120-122.

In other embodiments, the information linked with the electronic file is stored on the mobile telephony devices 120-122. In particular, a copy of the information linked with the electronic file or a cache of the information linked with the electronic file is stored on the mobile telephony devices 120-122. Thus, search and retrieval of electronic files from the electronic file database 104 is provided based on the information stored on the mobile telephony devices 120-122.

In particular, search and retrieval may be provided from any location by way of the mobile telephony devices 120-122 with direct wireless communication with a computer system, for example the computer system 140 or some other computer system, and the computer system communicating with the electronic file database 104. The mobile telephony devices 120-122 are queried based on user specified information, and a results list formed of a plurality of electronic files linked with the user specified information is retrieved from the electronic file database 104. For example, individual A wants to retrieve electronic files 150 relating to a project. If a copy of the information linked with electronic files 150 is stored on the individual A's mobile telephony device 120, then individual A may use the mobile telephony device 120 to retrieve the electronic files 150. The individual A enters specific information (e.g., meeting with Tom, Monday Jul. 1, 2007, Building A, room 806, etc.) into the mobile telephony device 120, and the mobile telephony device 120 by communicating with the electronic file database 104 retrieves the electronic files 150. In an embodiment, the system 100 and/or the application 102 may recognize that the user is browsing files associated with a particular location, event, or other recognizable contextual cue and query the user if they want to retrieve all files associated with the contextual cue. For example, when visiting a location of a cabin and browsing picture files, the system 100 and/or the application 102 may identify the association between the current location at the cabin and a large number of picture files (for example pictures taken during a family vacation at the cabin in a previous year) that are associated with the contextual cue of the location of the cabin and ask if the user wants to retrieve all picture files associated with the location of the cabin.

In addition to associating contextual information with the electronic files 150 automatically, in an embodiment, the system 100 and/or the application 102 may provide an interface for a user to manually or explicitly associate cues or tags with the files 150 for use in searching for and retrieving the files 150.

Figure 2:
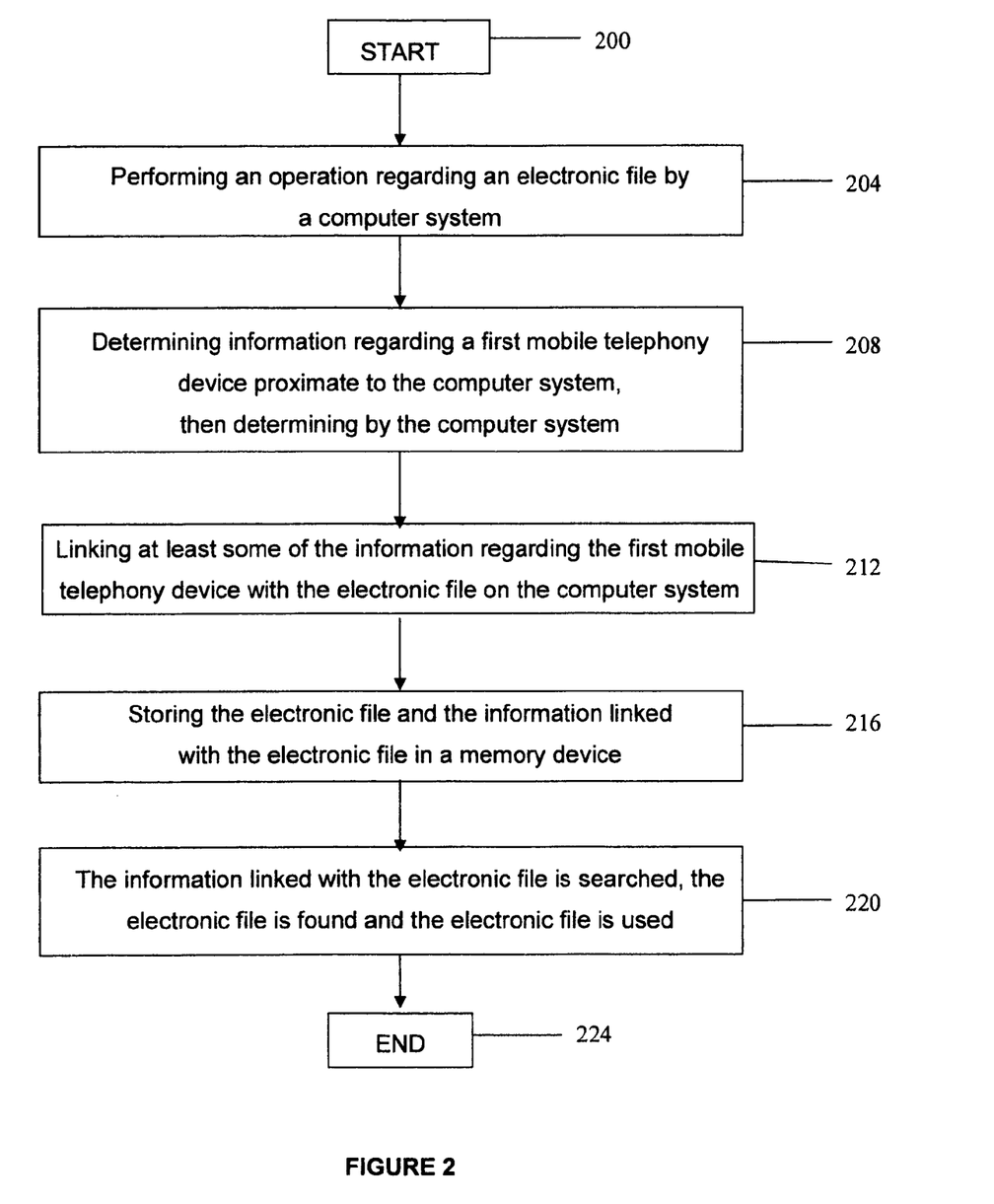
FIG. 2 shows a method in accordance with at least some embodiments.

FIG. 2 shows a method in accordance with at least some embodiments. In particular, the method starts (block 200) and moves to performing an operation on an electronic file by a computer system (block 204). In at least some embodiments, the operations performed on the electronic file by the computer system may comprise creating an electronic file, editing an electronic file, deleting an electronic file, executing an electronic file, or a combination of one or more of these operations. Next, information about a first mobile telephony device is determined by the computer system (block 208). The information from the mobile telephony device is determined in some embodiments by direct wireless communication between the mobile telephony device and the computer system, monitoring the wireless communication between the mobile telephony device and a base transceiver station, or monitoring mobile telephony device to mobile telephony device communication. Thereafter, at least some of the information determined about the mobile telephony device is linked with the electronic file on the computer system (block 212). The information linked with the electronic file and the electronic file is stored in a memory device (block 216). The information linked with the electronic file is searched, the electronic file is found, and the electronic file is used (block 220). The method ends (block 224).

Figure 3:
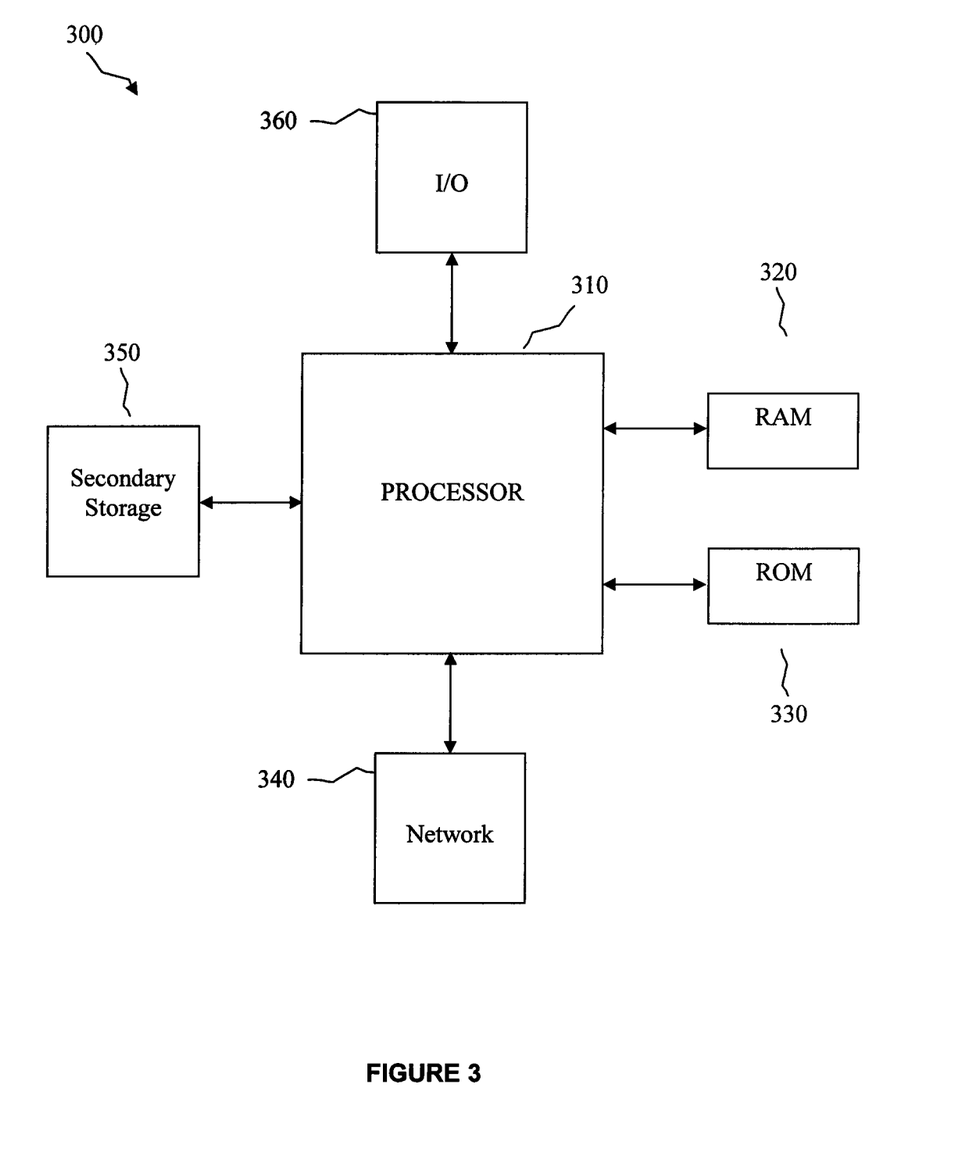
FIG. 3 shows a general purpose computer system suitable for implementing the several embodiments of the disclosure.

Any of the databases or application programs described above may be implemented on any computer system with sufficient processing power, memory resources, and network throughput capability to handle the necessary workload placed upon it. FIG. 3 illustrates a computer system suitable for implementing one or more embodiments disclosed herein. The computer system 300 includes a processor 310 (which may be referred to as a central processor unit or CPU) that is in communication with memory devices including secondary storage 350, read only memory (ROM) 330, random access memory (RAM) 320, input/output (I/O) devices 360, and network connectivity devices 340. The processor may be implemented as one or more CPU chips.

The secondary storage 350 is comprised of one or more disk drives or tape drives and is used for non-volatile storage of data and as an over-flow data storage device if RAM 320 is not large enough to hold all working data. Secondary storage 350 may be used to store programs which are loaded into RAM 320 when such programs are selected for execution. The ROM 330 is used to store instructions and perhaps data which are read during program execution. ROM 330 is a non-volatile memory device which typically has a small memory capacity relative to the larger memory capacity of secondary storage. The RAM 320 is used to store volatile data and perhaps to store instructions. Access to both ROM 330 and RAM 320 is typically faster than to secondary storage 350.

I/O devices 360 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 340 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 340 may enable the processor 310 to communicate with an Internet or one or more intranets. With such a network connection, it is contemplated that the processor 310 might receive information from the network, or might output information to the network in the course of performing the above-described method steps. Such information, which is often represented as a sequence of instructions to be executed using processor 310, may be received from and outputted to the network, for example, in the form of a computer data signal embodied in a carrier wave Such information, which may include data or instructions to be executed using processor 310 for example, may be received from and outputted to the network, for example, in the form of a computer data baseband signal or signal embodied in a carrier wave. The baseband signal or signal embodied in the carrier wave generated by the network connectivity devices 340 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 310 executes instructions, codes, computer programs, scripts which it accesses from hard disk, floppy disk, optical disk (these various disk based systems may all be considered secondary storage 350), ROM 330, RAM 320, or the network connectivity devices 340.

Figure 4:
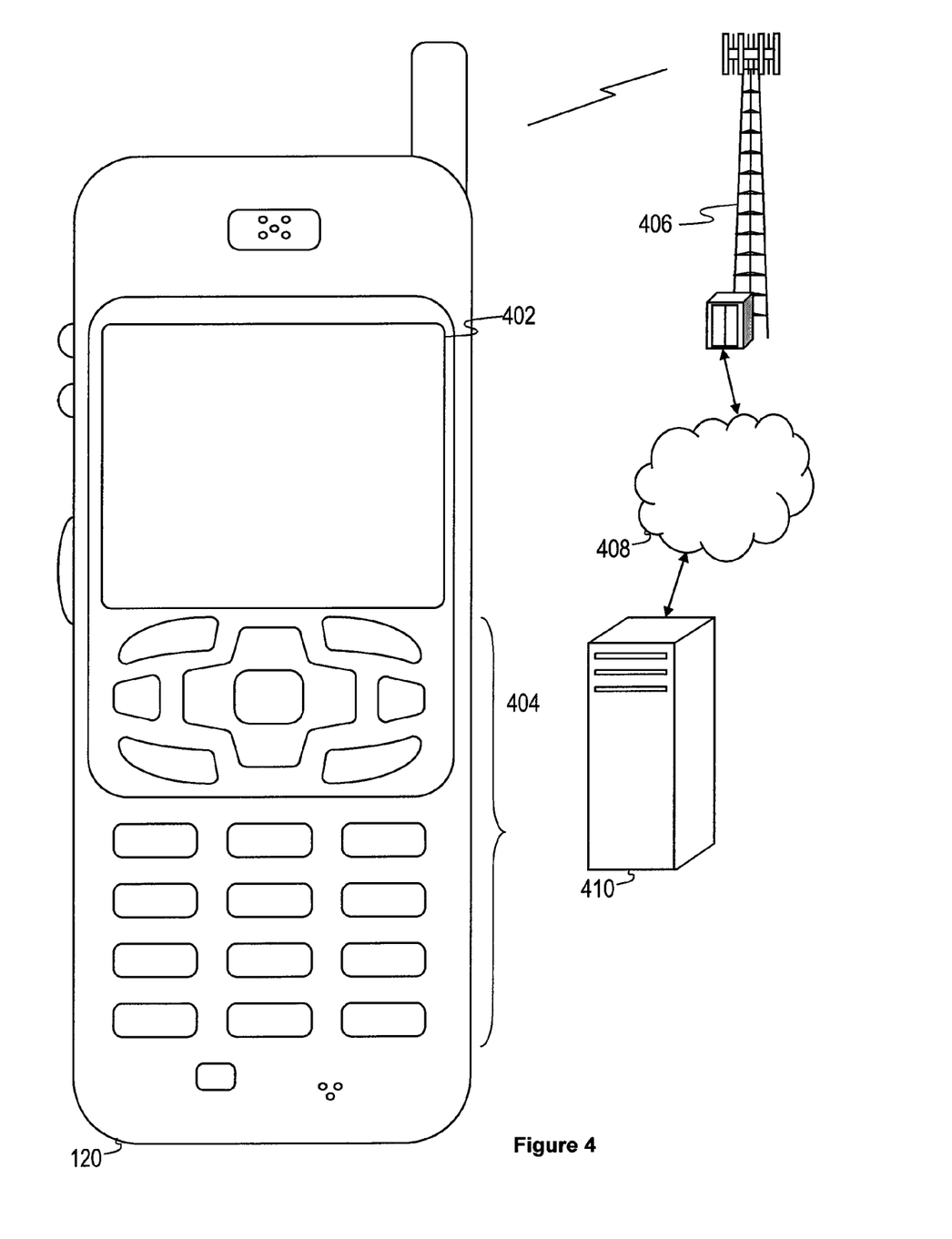
FIG. 4 shows a mobile telephony device suitable for implementing the several embodiments of the disclosure.

FIG. 4 shows a wireless communications system including the mobile telephony device 120. FIG. 4 depicts the mobile telephony device 120, which is operable for implementing aspects of the present disclosure, but the present disclosure should not be limited to these implementations. Though illustrated as a mobile phone, the mobile telephony device 120 may take various forms including a wireless handset, a pager, a personal digital assistant (PDA), a portable computer, a tablet computer, or a laptop computer. Many suitable handsets combine some or all of these functions. In some embodiments of the present disclosure, the mobile telephony device 120 is not a general purpose computing device like a portable, laptop or tablet computer, but rather is a special-purpose communications device such as a mobile phone, wireless handset, pager, or PDA. The mobile telephony device 120 may support specialized activities such as gaming, inventory control, job control, and/or task management functions, and so on.

The mobile telephony device 120 includes a display 402 and a touch-sensitive surface or keys 404 for input by a user. The mobile telephony device 120 may present options for the user to select, controls for the user to actuate, and/or cursors or other indicators for the user to direct. The mobile telephony device 120 may further accept data entry from the user, including numbers to dial or various parameter values for configuring the operation of the handset. The mobile telephony device 120 may further execute one or more software or firmware applications in response to user commands. These applications may configure the mobile telephony device 120 to perform various customized functions in response to user interaction. Additionally, the mobile telephony device 120 may be programmed and/or configured over-the-air, for example from a wireless base station, a wireless access point, or a peer mobile telephony device 120.

The mobile telephony device 120 may execute a web browser application which enables the display 402 to show a web page. The web page may be obtained via wireless communications with a base transceiver station 406, a wireless network access node, a peer mobile telephony device 120 or any other wireless communication network or system. The base transceiver station 406 (or wireless network access node) is coupled to a wired network 408, such as the Internet. Via the wireless link and the wired network, the mobile telephony device 120 has access to information on various servers, such as a server 410. The server 410 may provide content that may be shown on the display 402. Alternately, the mobile telephony device 120 may access the base transceiver station 406 through a peer mobile telephony device 120 acting as an intermediary, in a relay type or hop type of connection.

Figure 5:
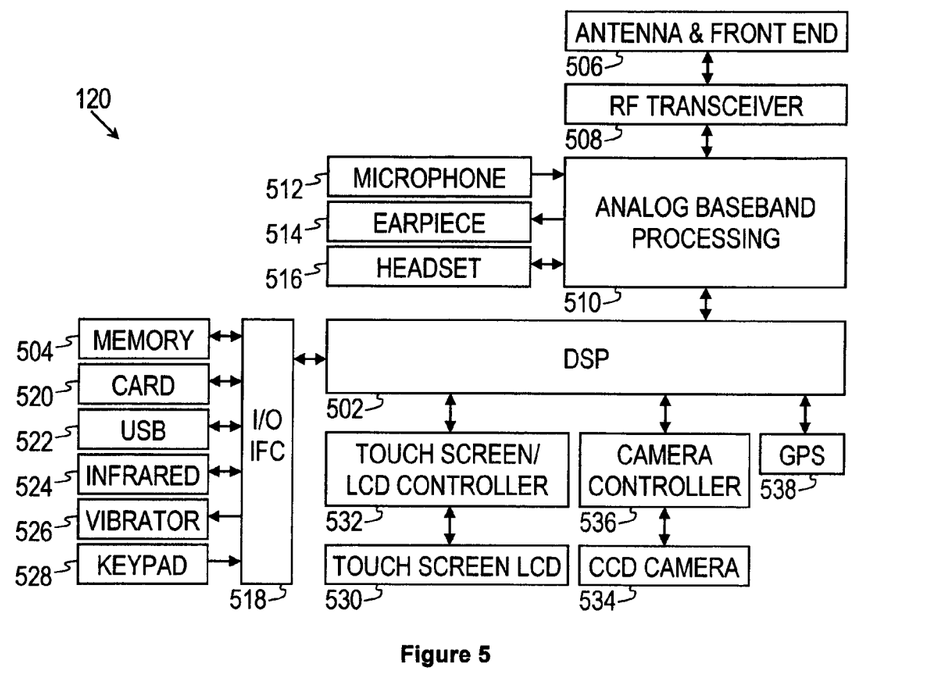
FIG. 5 shows a block diagram of a mobile telephony device according to an embodiment of the disclosure.

FIG. 5 shows a block diagram of the mobile telephony device 120. While a variety of known components of the mobile telephony device 120 are depicted, in an embodiment a subset of the listed components and/or additional components not listed may be included in the mobile telephony device 120. The mobile telephony device 120 includes a digital signal processor (DSP) 502 and a memory 504. As shown, the mobile telephony device 120 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile telephony device 120 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile telephony device 120 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile telephony device 120 to send and receive information from a cellular network or some other available wireless communications network or from a peer mobile telephony device 120. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile telephony device 120 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile telephony device 120 to function as a peripheral device to exchange information with a personal computer or other computer system. The infrared port 524 and other optional ports such as a Bluetooth interface or an IEEE 802.11 compliant wireless interface may enable the mobile telephony device 120 to communicate wirelessly with other nearby handsets and/or wireless base stations.

The input/output interface 518 may further connect the DSP 502 to the vibrator 526 that, when triggered, causes the mobile telephony device 120 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile telephony device 120. Another input mechanism may be the touch screen LCD 530, which may also display text and/or graphics to the user. The touch screen LCD controller 532 couples the DSP 502 to the touch screen LCD 530.

The CCD camera 534 enables the mobile telephony device 120 to take digital pictures. The DSP 502 communicates with the CCD camera 534 via the camera controller 536. The GPS sensor 538 is coupled to the DSP 502 to decode global positioning system signals, thereby enabling the mobile telephony device 120 to determine its position. In another embodiment, a camera operating according to a technology other than Charge Coupled Device cameras may be employed. Various other peripherals may also be included to provide additional functions, e.g., radio and television reception.

Figure 6:
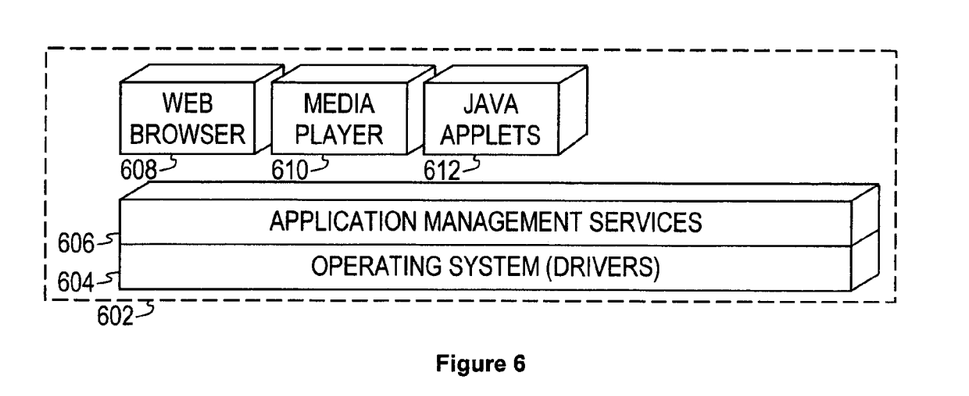
FIG. 6 is a block diagram of a software configuration for a mobile telephony device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile telephony device 120. Also shown in FIG. 6 are a web browser application 608, a media player application 610, and JAVA applets 612. The web browser application 608 configures the mobile telephony device 120 to operate as a web browser, allowing a user to enter information into forms and select links to retrieve and view web pages. The media player application 610 configures the mobile telephony device 120 to retrieve and play audio or audiovisual media. The JAVA applets 612 configure the mobile telephony device 120 to provide games, utilities, and other functionality.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for linking information from a mobile telephony device with an electronic file, comprising:
    performing, by a computer device, an operation on an electronic file;
    while performing the operation on the electronic file, determining, by the computer device, that a mobile telephony device is in direct wireless communication with the computer device from a location proximate to the computer device;
    determining, by the computer device, contextual information about the mobile telephony device relating to the operation being performed by the computer device;
    linking, by the computer device, the contextual information with the electronic file on the computer device;
    storing, by the computer device, the electronic file and the contextual information linked with the electronic file in a memory device, wherein the memory device stores a plurality of electronic files;
    receiving an input comprising some of the contextual information;
    searching the memory device based on the input; and
    presenting results of the searching, wherein the results identify the electronic file.

2. The method as defined in claim 1 wherein determining the contextual information further comprises determining at least one selected from the group consisting of information about a location of the mobile telephony device, information about a user of the mobile telephony device, and information from a calendar on the mobile telephony device.

3. The method as defined in claim 1 wherein the determining further comprises monitoring wireless signals between the mobile telephony device and a base transceiver station.

4. The method as defined in claim 1 wherein determining the contextual information further comprises determining information about presence of a second mobile telephony device.

5. The method as defined in claim 4 wherein the linking further comprises linking information about the second mobile telephony device with the electronic file.

6. The method as defined in claim 1 wherein storing the contextual information linked to the electronic file further comprises storing the contextual information linked with the electronic file in the mobile telephony device.

7. The method of claim 1 wherein the contextual information further comprises one of a location or a place.

8. The method of claim 1 wherein the contextual information further comprises biometric information.

9. A system for linking information from a mobile telephony device with an electronic file, comprising:
    a memory device that stores a plurality of electronic files; and
    a computer device configured to perform an operation on an electronic file, wherein the computer device is configured to determine that a mobile telephony device is in direct wireless communication with the computer device from a location proximate to the computer device while performing the operation, to determine contextual information about the mobile telephony device relating to the operation being performed by the computer device, to link the contextual information with the electronic file, wherein the computer device is configured to store the electronic file and the contextual information linked with the electronic file in a memory device.

10. The system as defined in claim 9 wherein the information about the mobile telephony device comprises at least one selected from a group consisting of information about a location of the mobile telephony device, information about a user of the mobile telephony device, and information from a calendar on the mobile telephony device.

11. The system as defined in claim 9 wherein the computer device is further configured to monitor the wireless signals between the mobile telephony device and a base transceiver station.

12. The system as defined in claim 9 wherein the computer device is further configured to determine information about presence of a second mobile telephony device, wherein the contextual information further comprises the information about presence of the second mobile telephony device.

13. The system as defined in claim 12 wherein the mobile telephony device and the second mobile telephony device comprises at least one selected from the group consisting of a mobile phone, a personal digital assistant (PDA), a pager, a mobile computer, a media player, or a mobile device comprising a combination of functionalities of these devices.

14. The system as defined in claim 9 wherein the device is configured to query the memory device based on a user specified information and retrieve a results list identifying the electronic file, and wherein the user specified information comprises at least some of the contextual information.

15. A non-transitory computer-readable medium storing a program on a computer device that, when executed by a processor, causes the processor to:
    perform an operation on an electronic file;
    while performing the operation on the electronic file, determine that a mobile telephony device is in direct wireless communication with the computer device from a location proximate to the computer device;
    determine contextual information about the mobile telephony device relating to the operation being performed by the computer device;
    link at least some of the contextual information with the electronic file; and
    store the electronic file and the contextual information linked with the electronic file in a memory device, wherein the memory device stores a plurality of electronic files.

16. The non-transitory computer-readable medium of claim 15 wherein when the processor determines information about the mobile telephony device, the program causes the processor to determine at least one selected from the group consisting of information about a location of the mobile telephony device, information about a user of the mobile telephony device, and information from a calendar on the mobile telephony device.

17. The non-transitory computer-readable medium of claim 15 wherein when the processor determines information about the mobile telephony device, the program causes the processor to monitor wireless signals between the mobile telephony device and a base transceiver station.

18. The non-transitory computer-readable medium of claim 15 wherein when the processor determines contextual information, the program causes the processor to determine information about a presence of a second mobile telephony device, and wherein the contextual information further comprises information about the presence of the second mobile telephony device.

19. The non-transitory computer-readable medium of claim 15 wherein when the processor stores, the program causes the processor to store the contextual information linked with the electronic file in the mobile telephony device.

20. The method of claim 1 wherein the contextual information further comprises at least one of a precipitation condition, a temperature, or a humidity.

* * * * *